Aug. 1, 1933.    B. M. SHIPLEY    1,920,328
CASH REGISTER
Original Filed March 29, 1923    5 Sheets-Sheet 1

Inventor
Bernis M. Shipley
By Carl Beust
Henry E. Stauffer
His Attorneys Aug. 1, 1933. B. M. SHIPLEY 1,920,328
CASH REGISTER
Original Filed March 29, 1923 5 Sheets-Sheet 3

Inventor
Bernis M. Shipley
By
His Attorneys

FIG.12

Aug. 1, 1933.  B. M. SHIPLEY  1,920,328

CASH REGISTER

Original Filed March 29, 1923   5 Sheets-Sheet 5

Inventor
Bernis M. Shipley
By Earl Benst
Ralph E. Warfield
His Attorneys

Patented Aug. 1, 1933

1,920,328

UNITED STATES PATENT OFFICE 1,920,328

CASH REGISTER

Bernis M. Shipley, Dayton, Ohio, assignor to The National Cash Register Company, Dayton, Ohio, a Corporation of Maryland Original application March 29, 1923, Serial No. 628,477. Divided and this application June 24, 1927. Serial No. 201,214

8 Claims. (Cl. 235—27.)

This invention relates to cash registers and the like machines, and more particularly to interlocking mechanisms therefor.

It is an object of this invention to provide mechanism which makes it necessary to press the proper clerk's key, transaction key and control key, and to depress them in their proper sequence before the machine can be released for adding operations.

Another object is to provide mechanism controlled by the total control lever, whereby the interlocks are thrown off to permit the machine to be released for total taking operations by depressing the control key only.

With these and incidental objects in view, the invention includes certain novel features of construction and combinations of parts, the essential elements of which are set forth in appended claims and a preferred form or embodiment of which is hereinafter described with reference to the drawings which accompany and form part of this specification.

General description

The machine to which this invention is shown applied is of the general type shown and described in the patent to Chryst No. 1,230,864, the patent to Fuller No. 1,242,170, and the patent to Shipley No. 1,619,796, and the application for Letters Patent of the United States, Serial No. 628,477 filed by B. M. Shipley, March 29, 1923. The present application is a division of this application.

The machine to which the present invention is shown applied, as illustrated and described in applicant's copending application, is adapted for use in places of business wherein many of the sales consist of a number of items which, together with the total thereof, constitute a transaction. The machine is designed to print each of these items on a detail strip and an inserted slip, or upon a check and an inserted slip, and then print the total of these items together with the date, consecutive number, clerk's initial and the word "total" on the check and slip. The same data except the date are printed on the detail strip.

There are three lines of totalizers in the machine just above referred to, as is usual in machines of this class. One of these lines (the upper one) has only one totalizer thereon which is used to accumulate the items of the transaction and is returned to zero when the total thereof is taken upon completion of each transaction.

The groups of transaction and clerks' keys are in the same bank, this bank being of the divided type, so that each group of keys can act separately. Each of these groups of keys controls one of the totalizer lines, the transaction keys controlling the front line and the clerks' keys controlling the rear line. These groups of keys select the totalizer for operation in a manner old and well known in the art and of which no detailed description will be included herein.

Mechanism is provided for enforcing a predetermined sequence of operation of the controlling keys in the following order: First, the clerks' key; second, the transaction key; and third, the release key. This is done in order to insure that the clerk will not forget or neglect to make a complete record of the transaction.

The printer of the machine disclosed in the parent case, Serial No. 628,477, is of the general type having novel features however, which enable it to be used to print the items and totals of the various transactions. Description of the printer is omitted from this application as it forms no part of the present invention.

Keyboard

Figure 12:
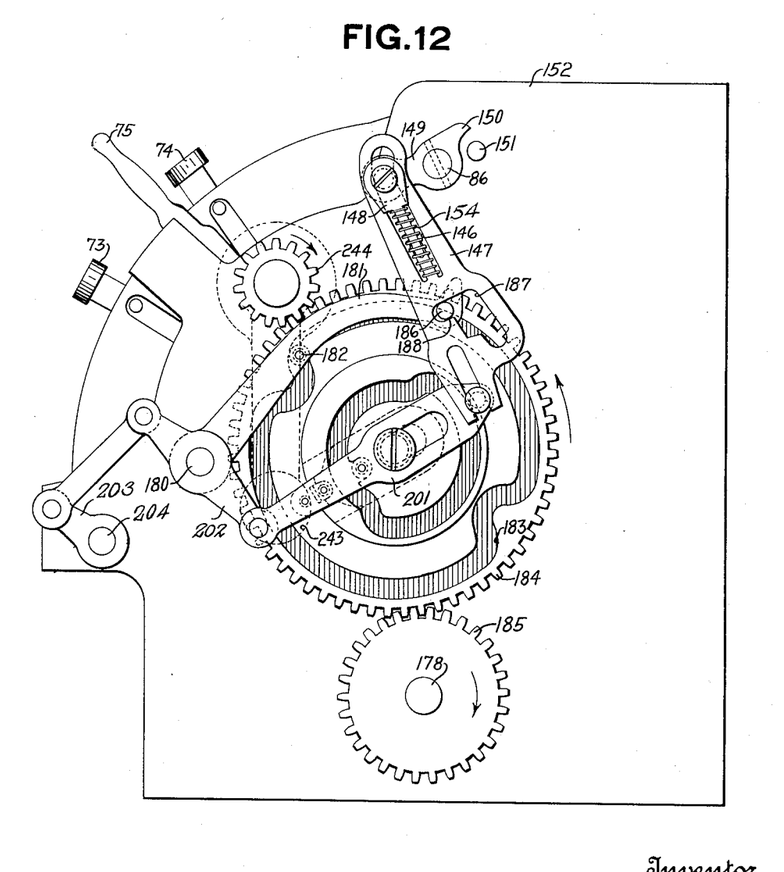
Fig. 12 is a right side elevation of the machine, and shows the crank used for manual operations, as well as the mechanism for controlling the operations of item entering and total taking operations.

The keyboard of the present machine consists of a plurality of banks of amount keys, not shown, one divided bank containing both transaction keys 71 and clerks' keys 72 (Fig. 1), a bank having but two keys therein, the item key 73 and the total key 74 (Figs. 3 and 4), and, a total lever 75 (Fig. 12). The operation of the keys followed by an operation of the machine sets up the amount and controls the printing thereof upon adding operations. The total lever controls the machine to make total and sub-total taking operations.

Transaction and clerks' keys

Figures 1, 2:
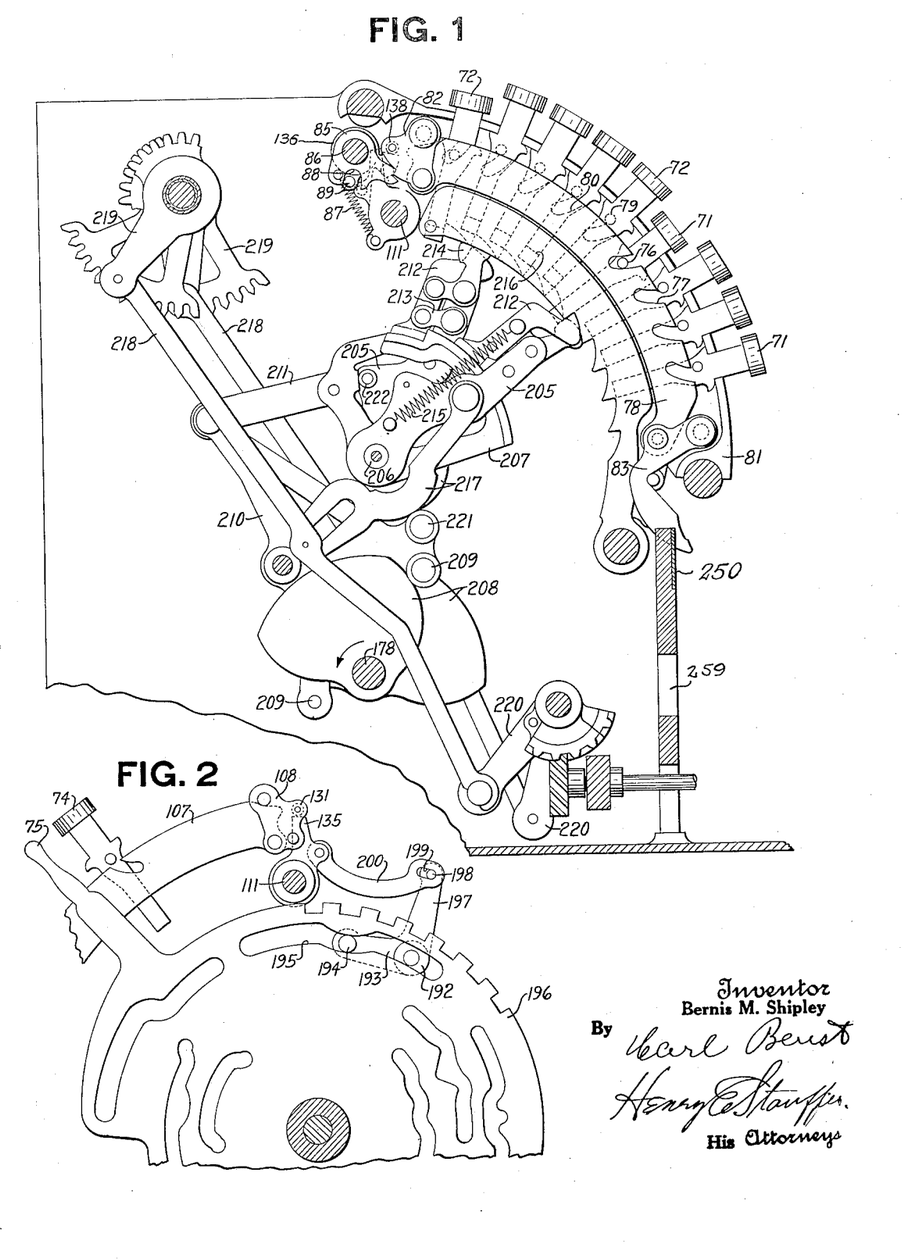
Fig. 1 is a section through the machine just to the left of the bank of clerks' and transaction keys, looking toward the right.
Fig. 2 is a detail view of the total lever, showing the mechanism for throwing off the interlocks on total taking operations.

The machine is provided with what is known in the art as a divided bank, which bank contains the clerks' keys 72, and the transaction keys 71 (Fig. 1). The clerks' keys are the five upper keys and the transaction keys are the four lower keys of this bank. The clerks' and transaction keys control the selection of the proper clerk and transaction totalizers, as well as the setting up of type wheels to print the appropriate symbols of each key depressed.

Each of the transaction keys 71 (Fig. 1) carries a pin 76 adapted to cooperate with a curved slot 77 cut in a detent 78, and thereby causes it to move downwardly. The clerks' keys 72 carry similar pins 79 cooperating with slots 80 in a detent 70 (Figs. 11 and 15) similar to detent 78 and cause downward movement of this detent when a clerk's key is depressed. The detents for the clerks' and transaction keys are located on opposite sides of the key frame 81 for this bank.

Figures 8, 11:
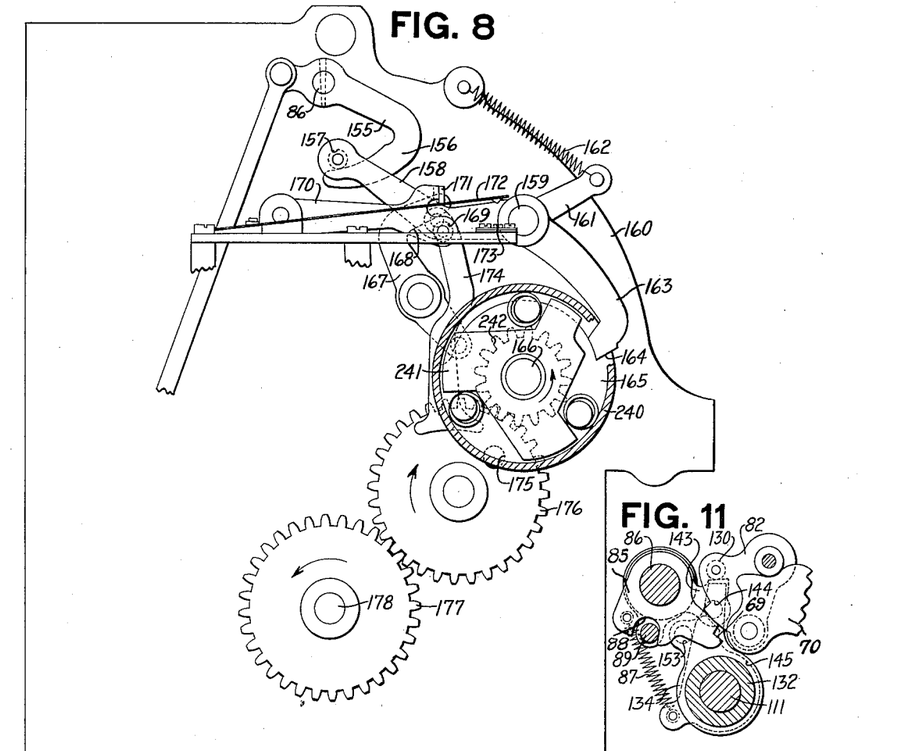
Fig. 8 is a left side elevation of the machine with the motor removed, and shows the motor clutch and its cooperating mechanism.
Fig. 11 is a detail view of the release interlocks controlled by the clerks' keys.
Figure 9:
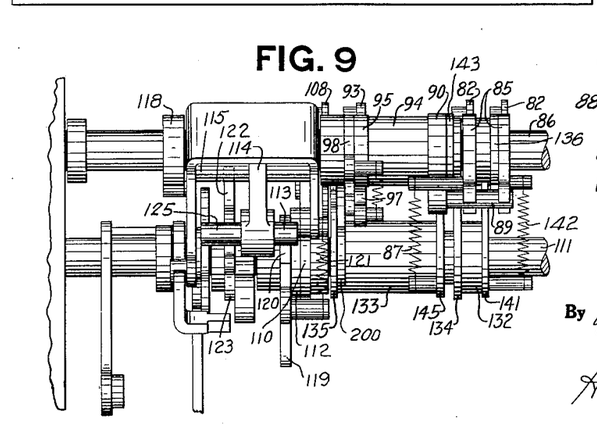
Fig. 9 is a rear elevation of the release and interlocking mechanism.
Figure 10:
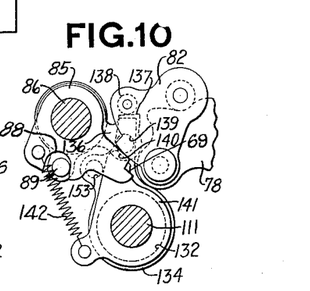
Fig. 10 is a detail sectional view, showing the interlocking mechanism controlled by the transaction keys.

The detent 78 for the transaction keys and the corresponding detent for the clerks' keys are movably supported by arms 82 and 83, pivoted to the key frame 81. The arms 82 (Figs. 9 and 10) at the upper ends of the detents have shoulders thereon which, when the detents are lowered, engage notches 69 formed in two latch arms 85 loosely mounted on a shaft 86 and held in contact with the arms 82 by springs 87 and 142. In Fig. 10 the above mentioned parts for the transaction keys are shown in their normal positions and in Fig. 1 in their latched positions. Fig. 11 shows corresponding parts associated with the clerks' keys.

The means for releasing the keys and permitting their return to normal positions will now be described. The latch arms 85 (Figs. 1 and 9) each have a notch 88 through which projects a long pin 89 carried by an arm 90 loose on shaft 86. When the shoulders on arms 82 move into engagement with the notches 69 in latch arms 85, the pin 89 and arm 90 are not moved, due to a clearance between the pin 89 and the notches 88 of latch arms 85, and the parts assume the positions shown in Fig. 1. Near the end of an adding operation the arm 90 and pin 89 are given a clockwise movement in a manner to be described later, which rocks the latch arms 85 clockwise (Fig. 1) and removes the notches 69 therein from engagement with the shoulders on arms 82, thereby permitting the detent 78 for the transaction keys and the corresponding detent 70 for the clerks' keys to move upwardly to normal positions.

Release keys

Figures 3, 4, 5:
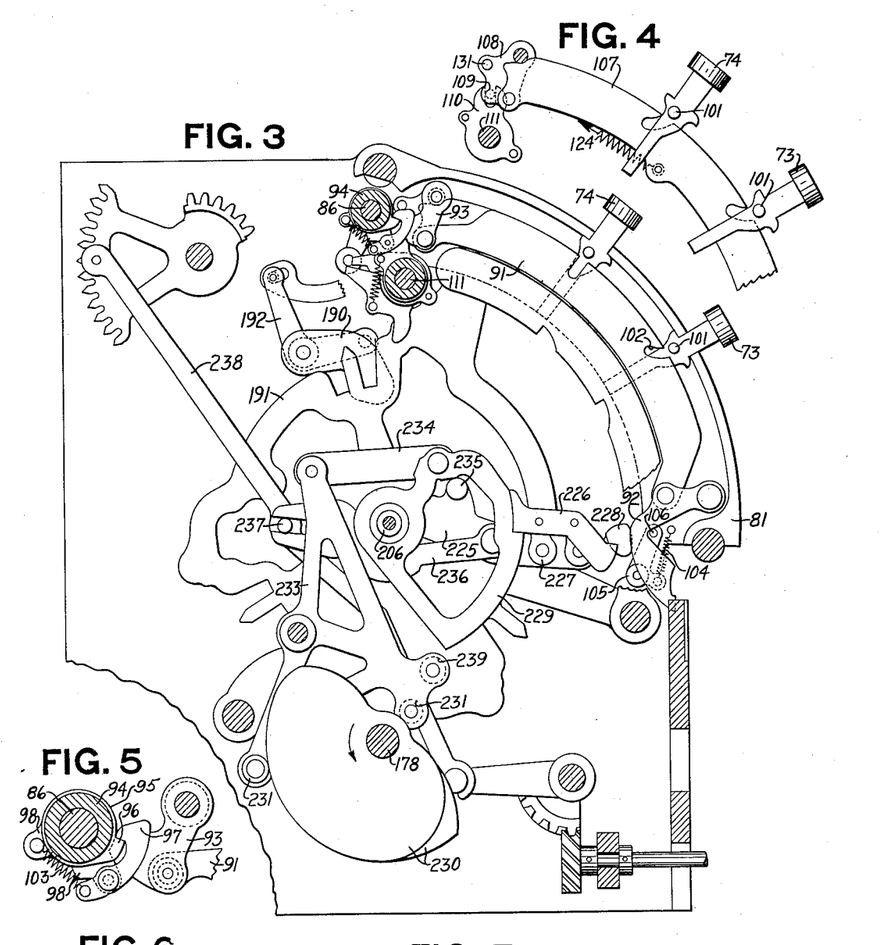
Fig. 3 is a section through the machine just to the left of the control bank, and looking toward the right.
Fig. 4 is a detail view of the two release keys and the release bar which cooperates therewith.
Fig. 5 is a detail view of the mechanism for preventing release of the clerks' keys and transaction keys during item entering operations.

The right hand bank contains but two keys, the "item" key 73 and the "total" key 74 (Figs. 3 and 4). These keys are supported by a key frame 81 similar to that for the clerks' and transaction keys. Both of these keys carry pins 101 projecting from each side thereof. These pins cooperate with a detent 91 which normally prevents the return of the clerks' and transaction keys to undepressed positions during item entering operations, and a release bar 107 to release the machine. When a transaction is made up of several items, it is desirable that the clerks' key 72 and transaction key 71 remain depressed until the completion of the transaction, when all keys will be released. This is accomplished by the detent 91, supported at its lower end by an arm 92 and at its upper end by arm 93, both of said arms being pivoted in key frame 81.

Fast on a hub 94 which also carries the arm 90 (Fig. 9) surrounding shaft 86 is a collar 95 provided with a shoulder 96 (Fig. 5). A pawl 97 carried by an arm 98 fast on the shaft 86 normally hooks over the shoulder 96. As can be seen in Fig. 5, when the parts are in their normal positions, the pawl 97 is held in engagement with the shoulder 96, due to the contact of the arm 93 with the pawl 97.

As will hereinafter be described the shaft 86 (Fig. 5) is rocked counter-clockwise to release the machine for operation. As arm 98 is fast on the shaft 86, this arm 98 and the pawl 97 carried thereby, are moved with the shaft. The pawl 97 has no function on this counter-clockwise movement. But when near the end of an adding operation, it is desired to release all the depressed keys, the shaft 86 is moved clockwise slightly past normal and then counter-clockwise to its normal position in a manner later to be described. On this clockwise movement the pawl 97 contacts the shoulder 96 and moves the collar 95, hub 94, arm 90 and pin 89 clockwise sufficiently to rock the notches 69 in the arms 85 out of engagement with the shoulders on arms 82, and thereby permit the springs (not shown) to return the detent 78 and its associated detent 70 to their normal positions thereby releasing the depressed keys 72 and 71.

When, however, the transaction comprises a series of items and it is desired to have the transaction and clerks' keys remain depressed until all of the items are entered and the total thereof printed, the item key 73 is depressed. This key carries a pin 101 (Figs. 3 and 4) adapted to cooperate with a slot 102 cut in the detent 91. This slot is inclined so that the detent will be forced downwardly when the key 73 is depressed. This downward movement will cause the arm 93 to be rocked away from the pawl 97, which will immediately rock clockwise about its pivot, due to a spring 103 (Fig. 5) extending between a projection on the arm 98 and the lower end of the pawl. Now, when the pawl is rocked, as above described, the pawl will not come in contact with the shoulder 96 and therefore the collar 95, hub 94, arm 90 and pin 89 will not be rocked to release the transaction and clerks' keys, as previously described. At the end of the operation, the detent 91 will be moved upwardly due to a spring 104 stretched between one arm of a bell crank 105 and the key frame 81. This bell crank carries a pin 106 which contacts the arm 92 on which the detent 91 is pivoted and rocks this arm clockwise to raise the detent to its normal position.

If the transaction consists of only one item, the total key 74 (Figs. 3 and 4) is depressed. The slot in the detent 91 opposite the pin 101 for this key is straight so that the depression of this key has no effect on the detent 91, and therefore the arm 93 will be held in engagement with the pawl 97 and the transaction and clerks' keys will be released at the end of the operation.

Releasing mechanism

The principal function of the keys 73 and 74 is to release the machine for operation. The manner in which this is accomplished will now be described.

On the opposite side of the keys 73 and 74 from that of the detent 91, just described, is a settable bar 107 (Fig. 4) pivotally mounted at its upper end on an arm 108 and at its lower end on a plain link (not shown) pivoted on the stud that supports the arm 92 which carries detent 91. The bar 107 has two slots cut therein, which normally lie opposite the pins 101 extending through the keys 73 and 74. It can be seen that when either the item key 73 or the total key 74 is depressed, the appropriate pin 101 will enter a slot in bar 107 and move said bar downwardly. This downward movement will rock the arm 108 (Fig. 6) counter-clockwise. This arm carries a pin 109 which cooperates with a bifurcated arm 110 loose on a shaft 111, supported by the side frame of the machine. Fastened to the arm 110 is a release pawl 112 (Figs. 6 and 7) having a projection with a squared end cooperating with a flattened stud 113 carried by an arm 114 fast on a hub 115 loose on the shaft 86. The hub 115 has integral therewith a finger 116 which extends over a pin 117 carried by an arm 118 fast on the shaft 86. This shaft is constantly under spring tension, as will be described later, in a counter-clockwise direction (Fig. 6) but is normally prevented from rotating, by the engagement of the stud 113, carried by the arm 114, with the square end on pawl 112. As the arm 114 cannot move, due to the above described condition, the finger 116 on its hub 115 prevents the shaft 86 from rocking counter-clockwise as it is in the path of the pin 117 on the arm 118, which is fast on shaft 86.

Loose on the shaft 111 is a non-repeat pawl 119 having a nose 120 which normally rests against the lower side of the flattened stud 113. A spring 121 extending between studs mounted in arm 110 and non-repeat pawl 119 tends to hold the parts in the positions shown in Fig. 6.

It will be recalled that when either of the keys 73 or 74 (Figs. 3 and 4) is depressed, the bar 107 is moved downwardly thereby rocking the arm 108 counter-clockwise (Fig. 6), whereby the pin 109 rocks the arm 110 and the releasing pawl 112 clockwise about the shaft 111. This movement of the releasing pawl 112 will move its square end upwardly and out of the path of the stud 113. As the nose 120 of the non-repeat pawl 119 rests against the stud 113, it remains stationary and the stud carried by the arm 114 moves counter-clockwise about the shaft 86 and between the projections of pawls 112 and 119, due to the fact that the pin 117 carried by the arm 118 is constantly pressing against the arm 116 which is integral with the hub 115 and arm 114. This rocking movement of the shaft 86 closes the circuit for the electric motor in a manner to be hereinafter described.

At the end of the operation of the machine the shaft 86 is rocked clockwise slightly past normal position and then counter-clockwise to normal. The arm 118 which is fast on this shaft and which carries pin 117 is of course rocked with the shaft. This causes the pin 117 to come into contact with an edge 122 of a bell crank loose on shaft 111. This bell crank has a tail 123 extending beneath an extension 125 (Fig. 9) of pin 113 carried by arm 114. It can be seen, therefore, that when the shaft 86 is given its clockwise movement (Fig. 6) the pin 117 will press down on the edge 122 and cam the bell crank clockwise about the shaft 111. This will bring the tail 123 into engagement with the extension 125 of the pin 113 and rock the arm 114 and hub 115 clockwise. When the pin 113 passes beyond the end of the releasing pawl 112, this pawl will move downwardly into the path of the pin due to the tension of a spring 124 (Fig. 4) stretched between a lug on the bar 107 and a pin on the key frame 81. When the shaft 86 starts to rotate counter-clockwise, it is prevented from doing so by the engagement of the releasing pawl 112 with the flattened side of the pin 113, until depression of the release key again removes the releasing pawl 112 from the path of the pin.

Sequence of operation

In order to make it necessary for the operator to make a complete record of the transaction, mechanism is provided which prevents release of the machine until a transaction key 71, a clerk's key 72, and one of the two release keys 73 or 74 have been depressed in the above mentioned sequence.

It will be remembered that when one of the clerks' keys 72 or one of the release keys 73 or 74 is depressed, its corresponding detent is rocked down. In order to prevent the depression of these keys out of their proper sequence there are provided two pins, a pin 130 for the clerks' keys (Fig. 11) and a pin 131 (Figs. 6 and 7) for the release key. These pins 130 and 131 are located on the arms 82 and 108, respectively. Fast on hubs 132 and 133 (Figs. 9 and 15) loose on shaft 111 are two arms 134 and 135, which extend upwardly and are normally just beneath the pins 130 and 131, respectively, thereby preventing downward movement of these pins and therefore of the arms 82 and 108 and the detent 70 and bar 107. This obstruction to the movement of the detent and bar, of course, prevents depression of any of their corresponding keys until these obstructions are removed.

Figures 13, 14, 15:
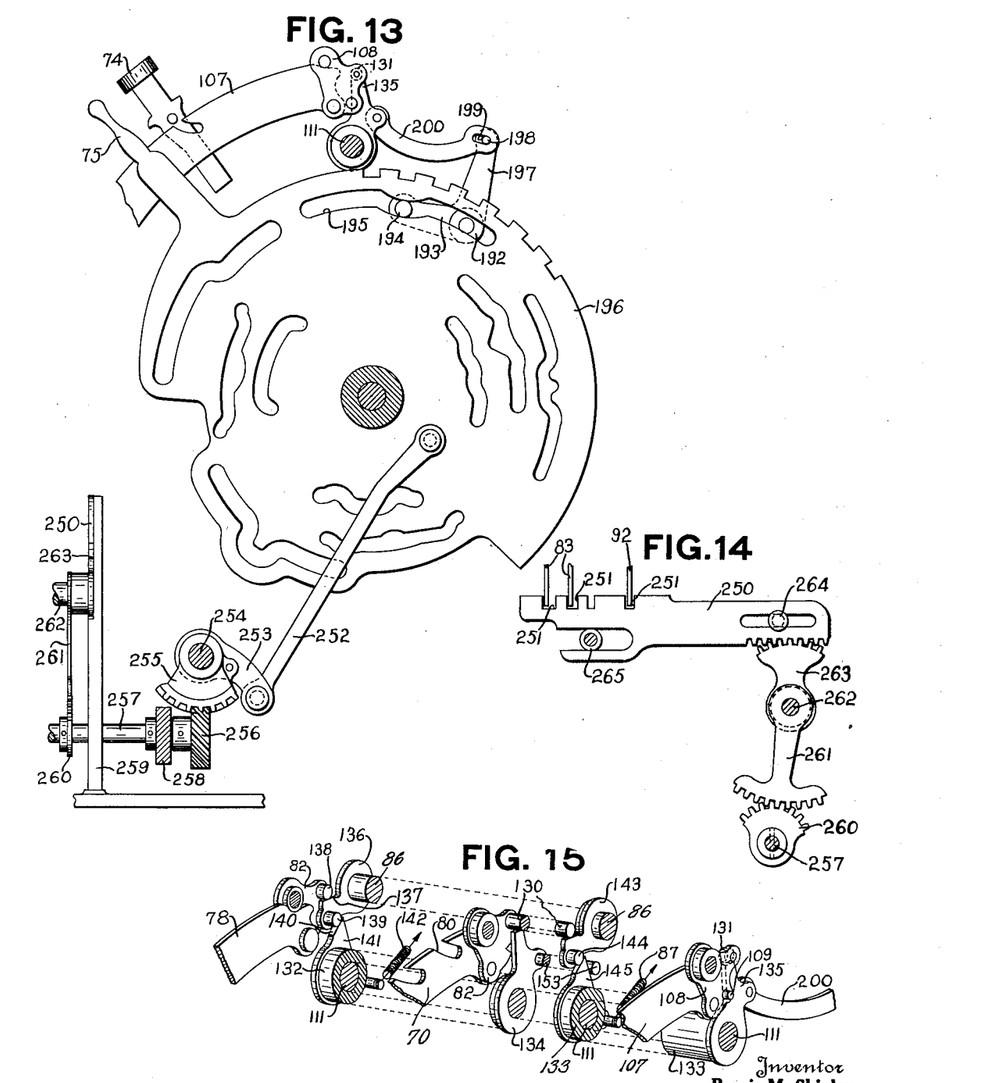
Fig. 13 is a detail view of the total lever, showing the mechanism for throwing out the interlocks on total taking operations, and for adjusting the interlocks to lock out certain transaction keys, when the total lever is in one of its total taking positions.
Fig. 14 is a detail view of a part of the mechanism for locking out the transaction key when the total lever is in certain of its total taking positions.
Fig. 15 is a perspective view, with the parts spread apart for clearness, and shows the interlock which makes it necessary to depress the clerks' and transaction keys in a predetermined order.

In order to remove these obstructions when the proper keys are depressed, the following mechanism is provided:

Freely mounted on shaft 86 is an arm 136 (Figs. 10 and 15) having an edge 137 just beneath a pin 138 in the arm 82 for the transaction keys. This arm 136 also carries a pin 139 which is held in engagement with an inclined edge 140 on an arm 141, by means of the spring 142 extending between a pin on the arm 141 and a pin on one of the latch arms 85. This arm 141 is fast on the hub 132 (Fig. 9). It can be seen, therefore, that when one of the transaction keys is depressed, the pin 138 strikes the edge 137 of the arm 136 and rocks this arm clockwise (Fig. 10) counter-clockwise (Fig. 15). The pin 139 on arm 136 then strikes the inclined edge 140 of the arm 141 and rocks this arm, its hub 132 and the arm 134 fast thereon, counter-clockwise far enough to remove the arm 134 from the path of the pin 130 (Figs. 11 and 15), thus permitting the movement of the detent 70 for the clerks' keys which can now be depressed.

The release keys, however, are still held against depression, and it is necessary to depress one of the clerks' keys 72 in order to permit such depression. When this is done the pin 130 carried by the arm 82 comes into contact with an arm 143 identical with the arm 136, and which carries a pin 144 engaging the inclined edge of an arm 145 fast on the hub 133. On the opposite end of this hub is secured the arm 135, which normally rests beneath the pin 131 (Figs. 6 and 7) on the arm 108 for the release bank. It is clear that when a clerk's key is depressed, the arm 135 will be rocked out from under the pin 131 and thereby permit depression of a release key to release the machine as above described.

Figure 6:
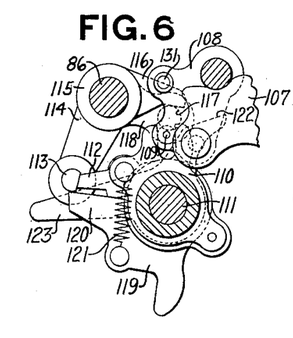
Fig. 6 is a detail sectional view of the releasing mechanism operated by the control bank.
Figure 7:
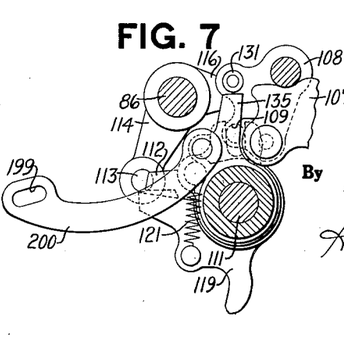
Fig. 7 is a detail view showing part of the release mechanism, and means for disabling the interlocks between the clerks' keys and the control bank.

As stated above, the shaft 86 is constantly being urged in a counter-clockwise direction, as viewed in Figs. 6 and 7, and when the releasing pawl 112 is removed from the path of the stud 113, as described above, the arm 114, arm 116, arm 118 and the shaft 86 are given a counter-clockwise movement by mechanism which will now be described. This movement of the shaft 86 as viewed in Fig. 12 is in clockwise direction.

A spring 154 (Fig. 12) is compressed between the bottom of a slot 146 in a link 147 and the shoulders of two identical spring clips 148 disposed one on each side of the link 147 and carried by an arm 149 pinned to the shaft 86.

When the shaft 86 is released, as described above, the spring 154 expands and rocks the arm 149 and shaft 86 clockwise (Fig. 12) until arrested by a stud 151 in the side frame 152 of the machine, which stud lies in the path of a finger 150 on the arm 149.

Fast on the left hand end of the shaft 86 is an arm 155 (Fig. 8) having a hooked end 156 cooperating with a roller 157 mounted in an arm 158 pivoted on a stud 159 projecting from the left side frame 160 of the machine. Rigidly secured to the arm 158 is an arm 161. A spring 162 is stretched between the end of the arm 161 and a pin projecting from the frame 160.

Also rigidly secured to the arm 158 is a locking arm 163 normally in engagement with a shoulder 164 formed on a disc 165 and the shoulder on a disc, not shown, loose on a stud 166. As the arm 163 is integral with the arm 158 it is rocked counter-clockwise by the springs 162, out of locking position, upon the movement of the release shaft 86 to enable the main shaft 178 to be rotated by the motor when the electrical contact is made.

Behind the disc 165 (Fig. 8) is another disc, (not shown), loose on the stud 166, normally under spring tension and which, when released by the movement of the locking arm 163, rocks a lever 167, pivoted on the side frame 160, by means of a cam surface on its periphery. The lever 167 has a cam edge 168 which cooperates with a roller 169 carried by an arm 170 pivoted on the motor frame and rocks said arm clockwise. This arm carries insulating material 171 and when said arm 170 is rocked, as above described the insulating material engages and depresses two spring contacts 172 far enough to make contact with two stationary contacts 173 (Fig. 8). The circuit through the motor is thereby closed and the motor operated.

Just before the end of the operation, the above mentioned disk which closes the motor circuit, is arrested, thereby permitting the arm 167 to be rocked counter-clockwise and the spring contacts 173 move to break the circuit. Pivoted to the arm 158 is a depending link 174 which at its lower end cooperates with a roller 175 carried by a gear 176. Near the end of the operation the roller 175 comes into contact with the lower end of the link 174 and raises it, thereby rocking the arms 158 and 163 clockwise. This brings the end of arm 163 into the path of shoulder 164 on the disk 165 and when this contact occurs the clutch connection is broken and the drive shaft stopped in its normal position. The hooked end 156 of the arm 155 is returned to its normal position at the end of the operation in a manner to be presently described, and assumes a position beneath the roller 157 on arm 158 and maintains this arm and the arm 163 in their normal positions.

The gear 176 meshes with a gear 177 pinned to the main drive shaft 178 of the machine. The mechanism mentioned above, for restoring the shaft 86 to its normal position will now be described.

Pivoted on a stud 180 (Fig. 12) mounted in the side frame 152 of the machine is an arm 181 which carries an anti-friction roller 182 projecting into a cam groove 183 cut in the side of a gear 184. The gear 184 meshes with a gear 185 pinned to the main drive shaft 178 of the machine. The gear 184 is given one-half of one counter-clockwise rotation on each cycle of operation of the machine and the cam race 183 therein is shaped to give the arm 181, a movement first down and then back to normal position near the end of each operation. Mounted in the right hand end of the arm 181 is a pin 186 projecting through an opening 187 in the link 147. When the shaft 86 is released and rocked clockwise (Fig. 12) under the influence of the spring 154, the stud on the arm 149, which carries the spring guides 148, is moved to the upper end of the slot 146 in the link 147. When, therefore, the arm 181 receives its downward movement as just described, the link 147 is also moved downward due to the engagement of the stud 186 carried on the arm 181 with a shoulder 188 on the link 147. This downward movement of the link 147 will rock the arm 149, and therefore, the shaft 86 counter-clockwise, as viewed in Fig. 12. This movement of the shaft 86 as viewed in Figs. 6 and 7 is clockwise and is for the purpose of removing the flattened stud 113 from beneath the releasing pawl 112 in order that this releasing pawl may be restored to its position in the path of the stud 113, thereby retaining the release shaft 86 in its normal position.

Mechanism including a pitman 201 (Fig. 12) pivoted at its left hand end to a lever 202, which is mounted on the stud 180, and which at its opposite end is connected by means of a link to an arm 203 pinned to a shaft 204 is for the purpose of changing the timing of the engagement of the totalizers during total and sub-total taking operations. As this mechanism forms no part of the present invention, no further description thereof will be included herein.

The machine is controlled for total taking and sub-total taking operations by means of the well known total control lever 75 (Fig. 2). On total taking operations it is necessary to depress a transaction key or a clerk's key singly in order to select a particular totalizer for operation. Therefore, it is necessary to provide mechanism for throwing out the interlocks which normally inhibit the depression of these keys. Mechanism provided for this purpose, will now be described.

Pivoted on a rigid arm 190 (Fig. 3) secured to the supporting frame 191 is a bell crank 192 (Figs. 2, 3 and 13) one arm 193 of which carries a stud 194 projecting through a slot 195 cut in a disk 196 integral with the total control lever 75. The bell crank 192 has an upwardly extending arm 197 in which is mounted a pin 198 projecting through an elongated opening 199 in a link 200. This link at its opposite end is connected to the arm 135, previously mentioned. When the total control lever is moved out of its add position, the slot 195 in the disk 196 through the pin 194 rocks the bell crank 192 clockwise and through the link 200 rocks the arm 135 clockwise. As this arm 135 is rigidly connected by the hub 133 with the arm 145 for the clerk's keys, this arm is likewise rocked and strikes a pin 153 (Figs. 11 and 15) in the arm 134 and carries the arm 134 with it. Thus the arms 134 and 135 which normally prevent depression of the clerks' keys and the release keys are rendered ineffective by the movement of the total lever.

The machine will then be released for operation by depressing a key corresponding to the position to which the total control lever 75 is moved and the release key depressed, as set forth in applicant's above mentioned copending application.

*Transaction and clerk's differential mechanism*

As before mentioned, the transaction and clerks' keys are in the same bank. This construction is known in the art as a "divided bank" and necessitates the use of two differential mechanisms with this bank. In their construction and operation these differentials are similar to those used with the amount banks, as shown and described in applicant's above referred to copending application. This differential mechanism includes two differentially movable arms 205 (Fig. 1) pivotally mounted on a stud 206. For the purpose of operating the driver 207 a pair of cam plates 208 are pinned to the main drive shaft 178. These cam plates cooperate with two anti-friction rollers 209 mounted on a Y-shaped lever 210, which at its upper end is connected by a link 211 to a driver 207. It will be remembered that the main drive shaft 178 receives one counter-clockwise rotation on each operation of the machine. The cams 208 are so shaped that they will impart a regular excursion first counter-clockwise and then clockwise to normal position to the driver 207, as viewed in Fig. 1. Each of the arms 205 carries a latch 212, supported thereon by a link 213 and a bell crank lever 214. These latches cooperate with the shoulders on the common driver 207 and are held in engagement therewith by springs 215, one of which is shown. When the driver 207 is operated by cams 208, the differentially movable arms 205 are carried, with their latches 212 up to points where the forwardly extending arms of the bell crank levers 214 engage the inner ends of the depressed clerk's and transaction keys. The transaction keys 71 have straight shanks and the bell crank 214 therefor abuts against the end of the depressed key when said bell crank is given its upward movement to disconnect the latch from the driver, as shown in Fig. 1. The bell crank lever 214 for the clerks' keys does not lie in the plane of the key shanks and therefore, it passes by the transaction keys. The clerks' keys, however, have blocks 216 fast on the side thereof, which extend into the path of the bell crank 214 and act as stops for the differentially movable arm 205 appropriate to these keys.

Pivoted on the arms 205 are beams 217 which at their left hand ends are bifurcated and straddle pins mounted in links 218. At their upper ends the links 218 are pivoted to arms 219 provided for the purpose of adjusting the indicators and selecting the totalizers with which the present machine is provided. At their lower ends the links 218 are connected to arms 220 provided for the purpose of adjusting the type carriers in the printing mechanism, as illustrated and described in the parent application. Two anti-friction rollers 221 only one of which is shown are mounted on the Y-shaped lever 210 and cooperate with the beams 217 to adjust the mechanism just described. On its clockwise movement a surface on the driver 207 engages pins 222 in the arms 205 thereby returning these arms to their normal positions. As viewed in Fig. 1, the driver 207 has been given a complete upward movement and has started on its return movement to its home position.

*Release bank differential*

The differential for the release bank is similar to that provided for the transaction and clerks' keys. The differentially movable arm 225 (Fig. 3) pivoted on the stud 206 has mounted thereon a latch 226 supported by a link 227 and a bell crank 228. The latch 226 cooperates with a shoulder on a driver 229 and is held in this position by a spring (not shown). The driver 229 is operated by two cams 230 pinned to the main drive shaft 178, and cooperating with anti-friction rollers 231 carried by a Y-shaped lever 233, which at its upper end is connected by a link 234 to the driver 229. The driver 229 is thereby given the same excursion as received by the driver 207 for the clerks' and transaction keys. On its clockwise movement, a surface on the driver 229 engages a pin 235 on the differentially movable arm 225 and returns this arm to its normal position. The arm 225 has pivoted thereto a beam 236, which at its left hand end is bifurcated and straddles a pin 237 carried by a link 238. The link 238 for the release key serves to set up indicators and type carriers, as described for the clerks' and transaction keys. The beam 236 for the release key is adjusted by means of an anti-friction roller 239 mounted in the Y-shaped lever 233.

*Key lock controlled by the total lever*

The total lever 75 has an add position and three total taking and three sub-total taking positions, as is well known in the art, and as is shown and described in the Shipley application, Serial No. 628,477, of which this application is a division. In moving the total lever to different positions out of "add", certain totalizer lines are selected by the total lever. It, therefore, follows that it is important that only the keys corresponding to the selected line of totalizers should be depressible. An interlock has been provided for obtaining this result, and includes a slide 250 (Fig. 14) provided with notches 251, thru which the tails of the arms 83 (Fig. 1), and 92 (Fig. 3), pass when the total lever is in adding position, but, when the total lever is shifted out of "add" one step either up or down, the slide 250 is shifted to the right or left as the case may be, thus positioning the slide 250 so as to prevent any one of the arms 83 or 92 from passing therethrough, thus locking out the transaction keys 71, clerks keys 72, and the item key 73, to make it necessary to depress the total key 74 to release the machine.

Movement of the total lever 75 to the second position out of "add", either up or down, shifts the slide 250 to position one of the notches opposite the arm 83, for the clerk's key 72 to permit depression of a clerk's key, and locks out the transaction keys 71 and the item keys 73.

Movement of the total lever to the third position shifts the slide far enough to move one of the notches opposite the tail of the arm 83 for the transaction key 71 and locks out the clerk's key 72 and the item key 73.

The shifting of the slide 250 is accomplished by a link 252 (Fig. 13), the upper end of which is pivoted to the total lever disk 196, and the lower end pivoted to an arm 253, mounted to rotate on a rod 254. A spiral segment is fast to the arm 253, and meshes with a spiral pinion 256, pinned on a shaft 257, carried by the framework of the machine, including the frames 258 and 259, and another frame (not shown). A segment 260 is fast on the shaft 257, adjacent the frame 259 and meshes with the segment 261 loose on the rod 262. The segment 262 is hubbed to another segment 263 meshing with teeth on the under side of the slide 250. The slide 250 is supported on studs 264 and 265.

The manual adjustment of the lever 75, through the link 252, arm 253, segment 255, pinion 256, shaft 257, segments 260, 261 and 263, adjusts the slide 256 (Fig. 14) either to the right or the left, depending upon the direction of adjustment of the total lever, to position the notches 251 to lock out or free the arms 83 and 92, as explained above.

*Operating mechanism*

The machine is adapted to be operated normally by an electric motor of any suitable design. The motor is mounted on the left side frame 160 (Fig. 8) of the machine, and is connected to the driving mechanism by means of the well known clutch mechanism. This clutch comprises means for connecting a motor driven shell 240 to a plate 241 which has secured thereto a gear 242 meshing with the gear 176 previously described. As this clutch mechanism is old and well known in the art, no further description thereof is thought necessary, and reference may be had to the above mentioned patents for a full and complete understanding thereof.

The machine may also be driven manually by means of a crank 243 (Fig. 12). This crank is shown dotted for clearness and is of the usual construction. It has fixed thereto a gear 244 meshing with the gear 184 previously mentioned and which meshes in turn with the gear 185 pinned to the main drive shaft 173. The ratio of these gears is such that two clockwise rotations of the crank will impart one clockwise rotation to the gear 155 and consequently to the main drive shaft 173 on each operation of the machine.

While the forms of mechanisms herein shown and described are admirably adapted to fulfill the objects primarily stated, it is to be understood that it is not intended to confine the invention to the forms or embodiment herein disclosed, for it is susceptible of embodiment in various forms all coming within the scope of the claims which follow.

What is claimed is:

1. In a machine of the class described, the combination of a divided bank of transaction and clerks' keys, a release bank comprising item and total keys, a total lever movable into adding, total of items, clerks' and transaction positions, means compelling an operation of a transaction key and then a clerk's key before a release key can be operated in adding operations, means for locking out the item release key when the total lever is in "total of items" position and for locking out the clerks' or transaction keys when the total lever is positioned in a transaction or clerk's position, and means for disabling said compelling means to permit the keys to be depressed as determined by said locking means.

2. In a machine of the class described, the combination of depressible keys; means to maintain the keys depressed; a machine release shaft; mechanism to release the depressed keys; a shouldered collar intermediate the shaft and the release mechanism; a pivoted device to connect the collar and shaft by engagement with the shoulder to transmit movement from the release shaft to the release mechanism; and keys to control the pivoted device.

3. In a machine of the class described, the combination of a plurality of groups of depressible keys; means to maintain the keys depressed during one or more operations; a release mechanism to release the keys during certain operations; a rockable machine release shaft; a pivoted coupling pawl, effective in one position to couple the shaft and the release mechanism to actuate the release mechanism, and ineffective in another position to couple the shaft and the release mechanism; and keys to determine the position of said pawl, the pawl maintaining one position upon the depression of one key, and another position upon the depression of another key.

4. In a machine of the class described, the combination of a plurality of groups of depressible keys; means to maintain the keys depressed during one or more operations; a release mechanism to release the keys during certain operations; a rockable shaft; a pivoted coupling pawl, effective in one position to couple the shaft and the release mechanism to actuate the release mechanism, and ineffective in another position to couple the shaft and the release mechanism to actuate the release mechanism; a spring normally tending to move the pawl to said ineffective position; and a key to maintain the pawl in its effective position.

5. In a machine of the class described, the combination of a plurality of groups of depressible keys; means to maintain the keys depressed during one or more operations; a release mechanism to release the keys during certain operations; a rockable shaft; a pivoted coupling pawl, effective in one position to couple the shaft and the release mechanism to actuate the release mechanism, and ineffective in another position to couple the shaft and the release mechanism to actuate the release mechanism; a spring normally tending to move the pawl to its ineffective position; a detent normally in position to maintain the pawl effective; and a key to hold the detent in position to maintain the pawl effective.

6. In a machine of the class described, the combination of a plurality of groups of depressible keys; means to maintain the keys depressed during one or more operations; a release mechanism to release the keys during certain operations; a rockable shaft; a pivoted coupling pawl, effective in one position to couple the shaft and release mechanism to actuate the release mechanism, and ineffective in another position to couple the shaft and the release mechanism to actuate the release mechanism; a spring normally tending to move the pawl into said ineffective position; a detent normally in position to maintain the pawl effective; a key to hold the detent in position to maintain the pawl effective; and another key to move the detent into a position to release the pawl to the action of the spring, whereby the spring moves the pawl into the ineffective position.

7. In a machine of the class described, the combination of depressible keys; means to maintain the keys depressed; a machine release shaft; mechanism to release the depressed keys; a shouldered collar intermediate the shaft and the release mechanism; and a pivoted device to connect the collar and shaft by engagement with the shoulder to transmit the movement from the release shaft to the release mechanism.

8. In a machine of the class described having depressible keys, means to return certain of said keys to normal undepressed position, the means including a rockable machine release shaft, a pivoted pawl having an effective and an ineffective position and forming part of a connection between the shaft and the keys, and other keys for determining which position the pawl will maintain during an operation.

BERNIS M. SHIPLEY.